United States Patent
Li et al.

(10) Patent No.: US 8,244,322 B2
(45) Date of Patent: Aug. 14, 2012

(54) PROTECTIVE COVER MECHANISM

(75) Inventors: Qing-Meng Li, Shenzhen (CN); Yung-Chang Yen, Taipei Hsien (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 1029 days.

(21) Appl. No.: 12/194,626

(22) Filed: Aug. 20, 2008

(65) Prior Publication Data

US 2009/0286431 A1    Nov. 19, 2009

(30) Foreign Application Priority Data

May 16, 2008 (CN) .......................... 2008 1 0301602

(51) Int. Cl.
  *H04M 1/00* (2006.01)
(52) U.S. Cl. ................. 455/575.8; 455/90.3; 455/575.1; 455/575.3; 455/575.4; 379/428.01; 379/433.12; 361/679.01; 361/727; 361/686; 439/135
(58) Field of Classification Search ............... 455/575.8, 455/90.3, 575.1, 575.3, 575.4; 379/428.01, 379/433.11, 433.12, 437; 361/679.01, 727, 361/686; 439/136, 135
See application file for complete search history.

(56) References Cited

U.S. PATENT DOCUMENTS

| | | | | |
|---|---|---|---|---|
| 5,697,124 A | * | 12/1997 | Jung | 16/341 |
| 6,652,297 B1 | * | 11/2003 | Zhang et al. | 439/136 |
| 6,731,913 B2 | * | 5/2004 | Humphreys et al. | 455/90.3 |
| 6,766,181 B1 | * | 7/2004 | Newman et al. | 455/575.3 |
| 7,797,818 B2 | * | 9/2010 | Saboune | 29/718 |
| 7,927,028 B2 | * | 4/2011 | Chan | 396/448 |
| 2006/0160585 A1 | * | 7/2006 | Miyagawa et al. | 455/575.7 |
| 2007/0213103 A1 | * | 9/2007 | Zaitsu | 455/575.3 |
| 2008/0026614 A1 | * | 1/2008 | Emerson et al. | 439/136 |

* cited by examiner

*Primary Examiner* — Marceau Milord
(74) *Attorney, Agent, or Firm* — Altis Law Group, Inc.

(57) ABSTRACT

A protective cover mechanism (26) and a portable electronic device (20) using the protective cover mechanism (26) is provided. The protective cover mechanism (26) for covering an interface (28) of the portable electronic device (20), comprises a protective cover (262) and a elastic plate (264). The protective cover (262) for covering the interface (28), and includes a sliding portion (2626), the sliding portion (2626) defines an aperture (2628) therein; The elastic plate (264) passes through the aperture (2628) for stopping the protective cover (262) away from the portable electronic device (20), the elastic plate (264) has a first end (2642) and an opposite second end (2646), the first end (2642) being mounted to the portable electronic device (20), the second end (2646) being biased against the interface (28).

13 Claims, 5 Drawing Sheets

PROTECTIVE COVER MECHANISM

BACKGROUND

1. Field of the Invention

The exemplary invention relates to protective cover mechanisms and, particularly to cover mechanisms for protecting interfaces of electronic devices.

2. Description of Related Art

Modern electronic devices, such as wireless telephone units, allow users to place a phone call and exchange data from virtually any location within the service area. Wireless telephone units typically incorporate a rechargeable battery pack so the device can be completely mobile. However, these battery packs must be periodically connected to a power source to be recharged. An external interface is usually provided on the device for connecting the battery or battery pack to an external power source. Additionally, an external interface might be provided on a wireless telephone to allow the phone to be connected to other electronic devices for transmitting and receiving data.

Wireless telephones are not the only modern electronic devices which can be connected to other devices to increase functionality. For example, even smaller computers such as palmtop or electronic notepad computers can be connected to larger computer systems, modems or printers to provide additional functions.

In all these examples, an electronic device needs an external port, interface or connector for easy connection to other electronic devices, accessories or networks. However, external interfaces must be protected from the external environment to function properly.

To protect external interfaces, ports and connectors on an electronic device, it is common to provide a cover that can, for example, be snapped or slid into place over the interface. However, after the covers are removed from the electronic device to access the interface, it is very easy to misplace and lose the cover.

Therefore, there is a room for improvement within the art.

BRIEF DESCRIPTION OF THE DRAWINGS

Many aspects of the exemplary protective cover mechanism can be better understood with reference to the following drawings. These drawings are not necessarily drawn to scale, the emphasis instead being placed upon clearly illustrating the principles of the exemplary protective cover mechanism. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EMBODIMENTS

Exemplary embodiments will now be described in detail below and with reference to the drawings. The protective cover mechanism is suitably assembled within the portable electronic device, such as the mobile phone, the personal digital handset, or the like.

Figure 1:
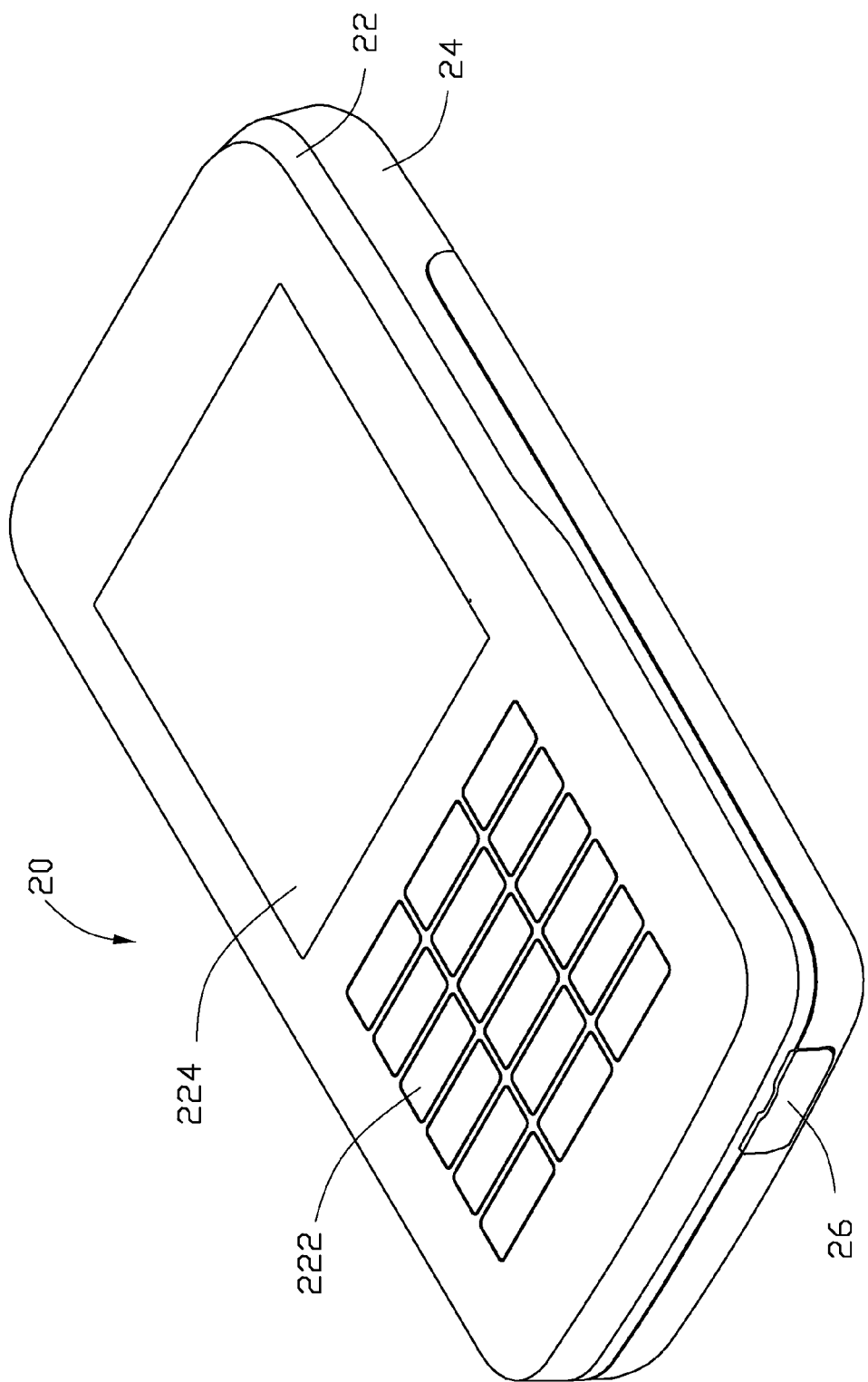
FIG. 1 is an assembled view of a portable electronic device using a protective cover mechanism according to an exemplary invention.
Figure 5:
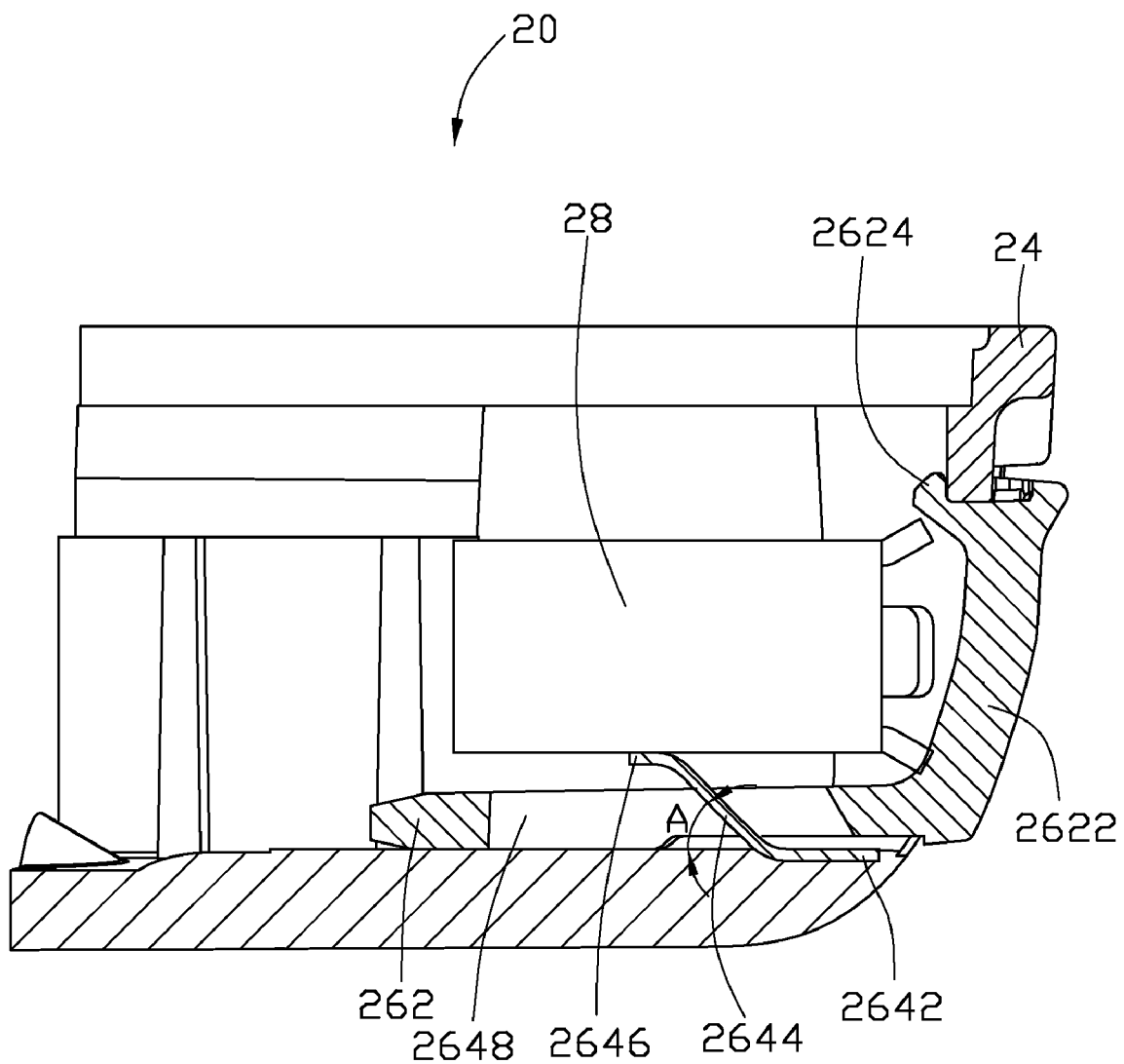
FIG. 5 is a sectional view of the portion of the portable electronic device shown in FIG. 4.

Referring to FIGS. 1 and 5, an exemplary portable electronic device in the form of a mobile phone 20, includes an upper housing 22, a lower housing 24 mounted to the upper housing 22, an interface 28 accommodated in the lower housing 24, and a protective cover mechanism 26 for covering and protecting the interface 28.

Figure 2:
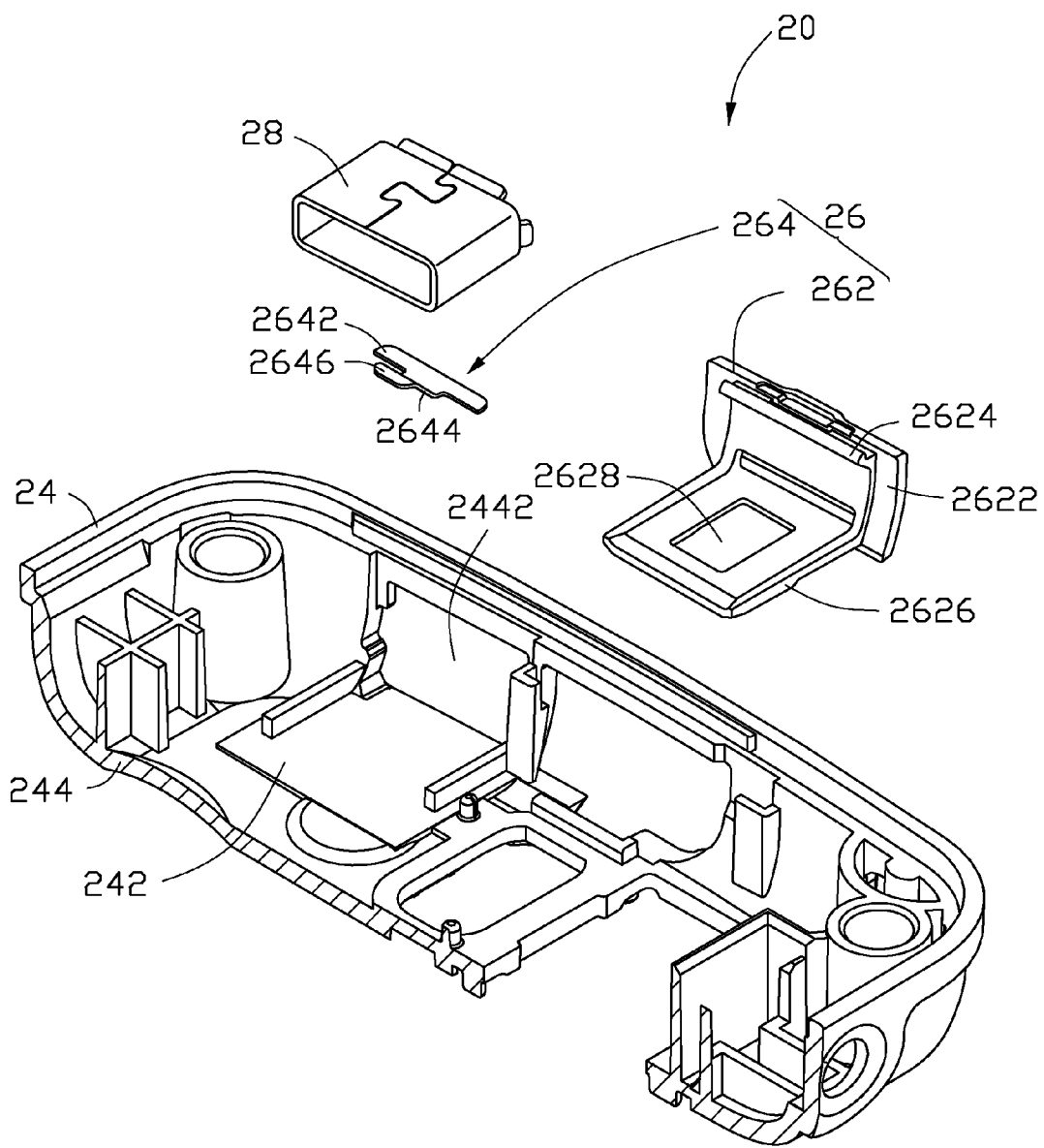
FIG. 2 is a partial cut-away and exploded view of a portion of the portable electronic device in FIG. 1.

Referring to FIG. 2, the lower housing 24 includes a bottom wall 242 and a peripheral wall 244 mounted on the bottom wall 242. The peripheral wall 244 has an opening 2442 corresponding to the interface 28.

Referring to FIG. 2, the protective cover mechanism 26 includes a protective cover 262 and an elastic plate 264. The protective cover 262 is substantially rectangular and has a surface 2622 facing the lower housing 24. A side of the surface 2622 has a securing portion 2624, e.g., a tenon, sized and shaped to engage with the lower housing 24 (shown in FIG. 3), and another side of the surface 2622 has a sliding portion 2626 protruding therefrom. In the exemplary embodiment, the sliding portion 2626 is a rectangular plate having a rectangular aperture 2628 for mating with the elastic plate 264.

Referring to FIG. 5, the elastic plate 264 includes a first end 2642, an opposite second end 2646, and a stopping portion 2644 connecting the first and second ends 2462, 2646. The first end 2642 is substantially a plate parallel to and secured to the bottom wall 242. The stopping portion 2644 extends from a side portion of the first end 2642 in the direction away from the bottom wall 242. The angle A (show in FIG. 5) between the stopping portion 2644 and the bottom wall 242 is less than about 90 degrees, the stopping portion 2644 is passed through the aperture 2628 for stopping the sliding portion 2626 from sliding away the lower housing 24. The second end 2646 extends from an end of the stopping portion 2644 in the direction facing the bottom wall 242 and parallel to the first end 2642. The second end 2646 is biased against the interface 28.

Figure 3:
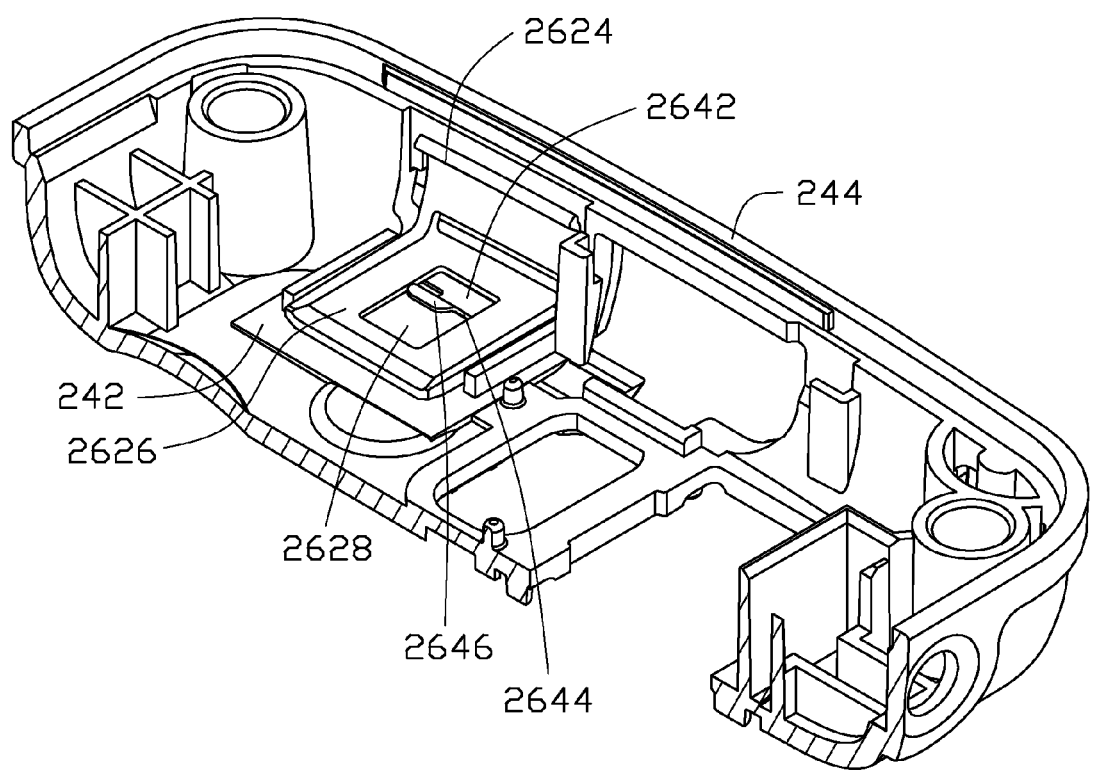
FIG. 3 is an isometric and assembled view of the portion of the portable electronic device in FIG. 2, when a protective cover mechanism is mounted to a lower housing.
Figure 4:
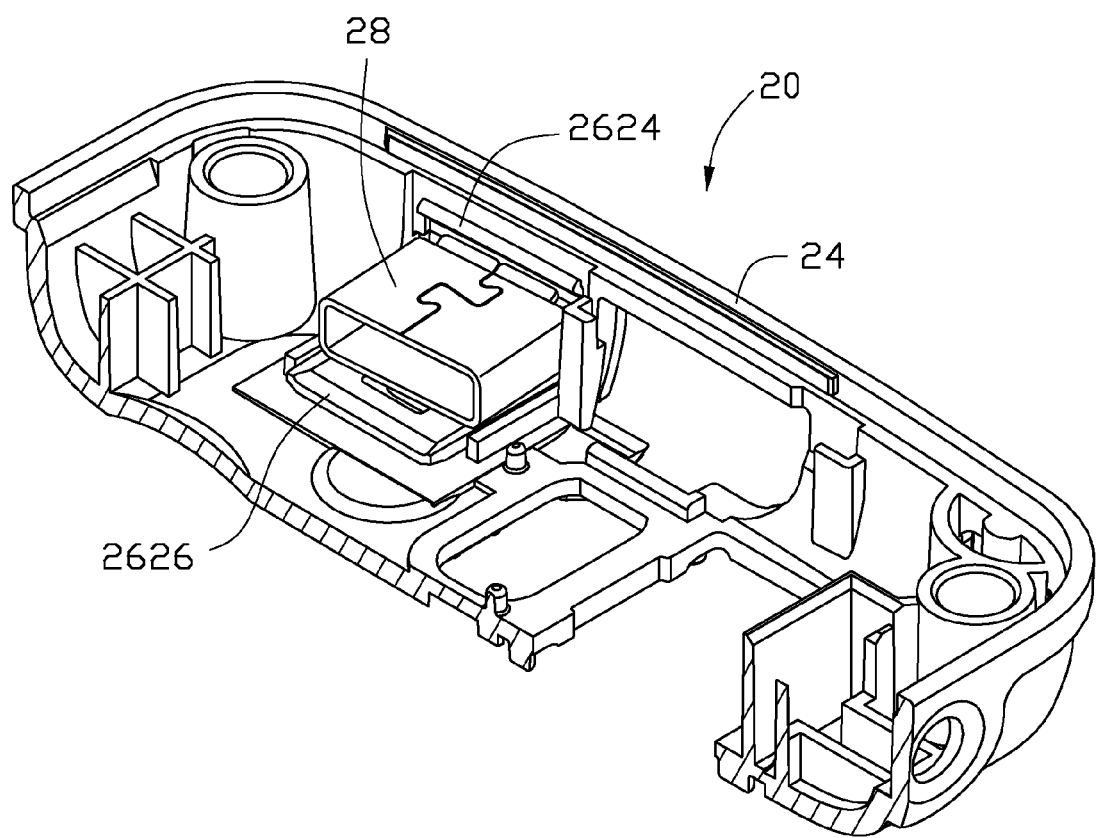
FIG. 4 is an isometric and assembled view of the portion of the portable electronic device in FIG. 2, when a protective cover and an interface are mounted to a lower housing.

Referring to FIGS. 3 to 5, when assembling the protective cover mechanism 26 to the lower housing 24, the first end 2642 is mounted (e.g., hot melted or welded) to the bottom wall 242, and then the sliding portion 2626 passes through the opening 2442 and inserted into the lower housing 24. During this stage, the stopping portion 2644 is positioned in the aperture 2628, and the securing portion 2624 iengages the lower housing 24. After that, the interface 28 is mounted to a circuit board (not shown) in the lower housing 24. During this stage, the interface 28 is biases against the second end 2646, thereby the protective cover mechanism 26 is assembled to the lower housing 24 and covers the interface 28.

In use, the securing portion 2624 is released from the lower housing 24, and then drives the protective cover 262 away from the lower housing 24, so that the sliding portion 2626 is pulled out from the lower housing 24 until the sliding portion 2626 is resisted by the stopping portion 2644. The interface 28 is exposed. The sliding portion 2626 can be resisted by the stopping portion 2644 to prevent the protective cover 262 detaching from the lower housing 24. In addition, the second end 2646 is biased against the interface 28, which further enhances the resisting force of the sliding portion 2626. As a result, the protective cover mechanism of the exemplary embodiment prevents the protective cover 262 detaching from the lower housing 24.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A protective cover mechanism for an interface of a portable electronic device, comprising:
    a protective cover for covering the interface, and the protective cover including a sliding portion protruding therefrom, the sliding portion defining an aperture therein; and
    an elastic plate passing through the aperture for stopping the protective cover away from the portable electronic device;
    wherein the sliding portion is slidably mounted to the portable electronic device so the protective cover is capable of sliding relative to the portable electronic device; the sliding portion is positioned on a surface of the protective cover facing the portable electronic device; the elastic plate includes a first end mounted to the portable electronic device and a stopping portion extending from the first end, the stopping portion passes through the aperture.

2. The protective cover mechanism as claimed in claim 1, wherein the sliding portion is a plate.

3. The protective cover mechanism as claimed in claim 1, wherein the portable electronic device includes a bottom wall, the first end is mounted to the bottom wall.

4. The protective cover mechanism as claimed in claim 3, wherein the stopping portion extends from an end of the first end in the direction away from the bottom wall.

5. The protective cover mechanism as claimed in claim 3, wherein the angle between the stopping portion and the bottom wall is less than about 90 degrees.

6. The protective cover mechanism as claimed in claim 3, wherein the elastic plate further includes a second end biased against the interface.

7. The protective cover mechanism as claimed in claim 6, wherein the second end extends from an end of the stopping portion in the direction facing the bottom wall and is parallel with the first end.

8. A portable electronic device, comprising:
    a housing having a interface mounted thereon;
    a protective cover for covering the interface, and the protective cover including a sliding portion protruding therefrom, the sliding portion defining an aperture therein; and
    an elastic plate retained to the housing and passing through the aperture for stopping the protective cover away from the portable electronic device;
    wherein the sliding portion is slidably mounted to the housing so the protective cover is capable of sliding relative to the housing; the sliding portion is positioned on the surface of the protective cover facing the housing, the sliding portion is a plate, the elastic plate includes a first end mounted to the housing and a stopping portion extending from the first end, the stopping portion passing through the aperture.

9. The portable electronic device as claimed in claim 8, wherein the housing including a bottom wall, the first end is mounted to the bottom wall.

10. The portable electronic device as claimed in claim 9, wherein the stopping portion extends from a side portion of the first end in the direction away from the bottom wall.

11. The portable electronic device as claimed in claim 9, wherein the angle between the stopping portion and the bottom wall is less than about 90 degrees.

12. The portable electronic device as claimed in claim 9, wherein the elastic plate further includes a second end biased against the interface.

13. The portable electronic device as claimed in claim 12, wherein the second end extends from an end of the stopping portion in the direction facing the bottom wall and is parallel with the first end.

* * * * *